Aug. 1, 1950 — R. D. DOWNING — 2,517,390
AUXILIARY CUTTER FOR HARVESTER PLATFORMS
Filed Dec. 22, 1948 — 2 Sheets-Sheet 2
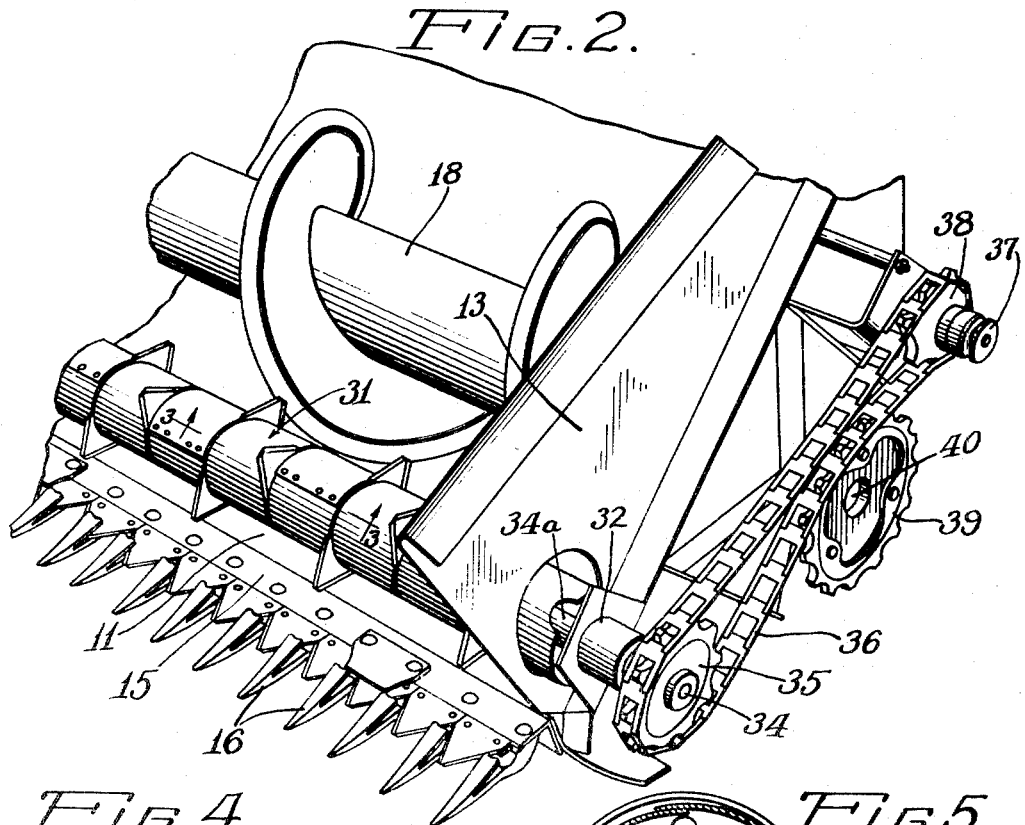
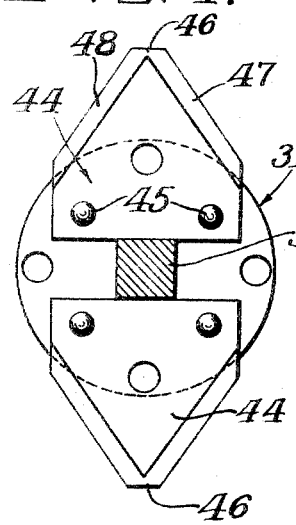
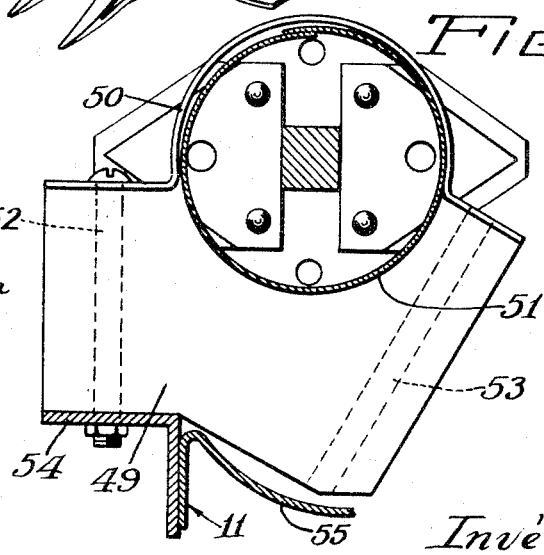
Inventor:
Rexford D. Downing
Atty.

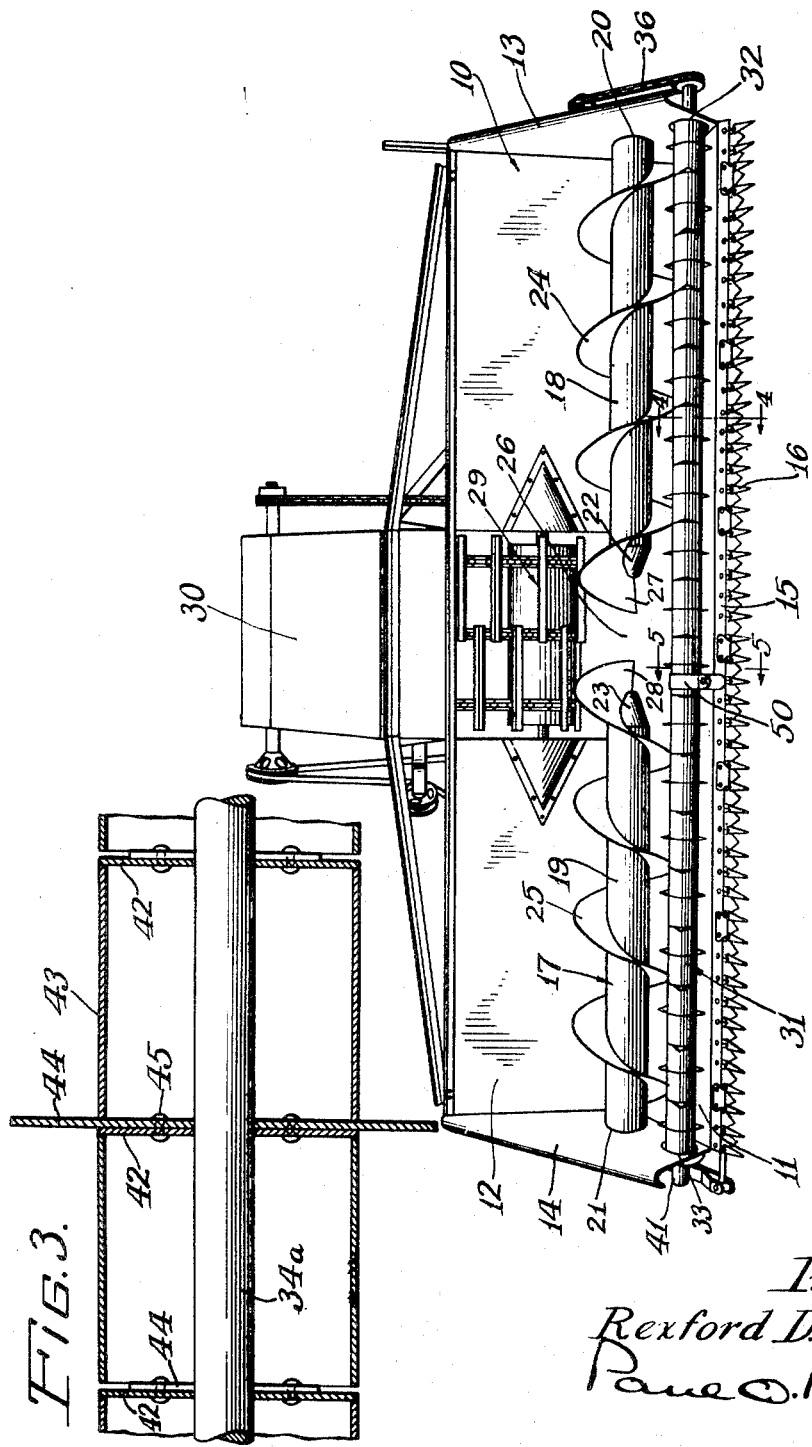

Patented Aug. 1, 1950

2,517,390

UNITED STATES PATENT OFFICE 2,517,390

AUXILIARY CUTTER FOR HARVESTER PLATFORMS

Rexford D. Downing, Rock Island, Ill., assignor to International Harvester Company, a corporation of New Jersey Application December 22, 1948, Serial No. 66,639

6 Claims. (Cl. 56—23)

This invention relates to a new and improved auxiliary cutter for harvester platforms.

Harvester platforms with their accompanying appurtenances perform the function of cutting grain standing in a field and thereupon delivering the cut grain from the platform. For example, in windrow harvesters the grain is transferred from the platform back to the field forming a windrow. In harvester threshers the cut grain is delivered from the platform to the separating or threshing mechanism. In hay choppers the hay is conveyed from the platform to a chopping mechanism and similarly throughout all harvester implements the platform performs the same job. The means for cutting the grain generally includes a reciprocating sickle disposed along the forward end of the platform and adapted to sever the stalks of grain adjacent their butt ends. The cut grain then falls rearwardly onto the floor of the platform where it is picked up by the conveyor and conveyed transversely of the platform. The conveyors used are of the canvas slatted type and more recently the conveyors employed are of the auger type. When auger conveyors are used the grain falls from the sickle under and to the rear of the auger whereupon it is moved laterally of the platform while remaining to the rear and under the auger under desirable conditions—that is, where the grain is standing upright and is not too long. However, should the grain be lying down due to adverse weather conditions or should the grain stalks be excessively long, then the auger type platform discussed above will have difficulty in properly cutting and conveying the grain. Under such conditions the auger conveyor very often obtains a hold on the stalks prior to the time of cutting and there is a definite tendency for the grain to wind around the auger causing tangling and eventual jamming of the feeding mechanism.

It is therefore a principal object of this invention to provide auxiliary cutting means for harvester platforms to insure cutting of the grain stalks prior to conveying of the stalks by a lateral feeding conveyor.

An important object of this invention is to supply an auxiliary cutter for harvester platforms spaced rearwardly and upwardly from the regular sickle type cutter bar and disposed forwardly of an auger conveying means on the platform.

Another and further important object of this invention is the provision of a rotary type cutter employed on harvester platforms in conjunction with the usual reciprocating cutter disposed along the forward edge of the platform.

A still further important object of this invention is to provide a tubular member journaled for rotation intermediate the sickle and auger conveyor on a harvester platform and having radially extending flat knife blades arranged to initially cut the grain stalks should the sickle fail to cut the stalk prior to its engagement with the auger conveyor.

Other and further important objects of this invention will become apparent from the disclosures in the following specification and accompanying drawings, in which:

Fig. 1 is a front elevational view of a harvester platform embodying the auxiliary cutter of this invention;

Fig. 2 is a partial perspective view of one end of the platform as shown in Fig. 1;

Fig. 3 is a sectional view taken on the line 3—3 of Fig. 2;

Fig. 4 is a sectional view taken on the line 4—4 of Fig. 1; and

Fig. 5 is a sectional view taken on the line 5—5 of Fig. 1.

As shown in the drawings:

The reference numeral 10 indicates generally a harvester platform having a floor portion 11, a generally vertically disposed back wall 12, and spaced side plates 13 and 14 joining the floor 11 with the back wall 12. A sickle bar 15 is adapted to reciprocate laterally within a guide member 16 composed of a plurality of forwardly extending spaced guide fingers. The sickle is adapted to cut the butt ends of grain as the harvester is propelled through a field of standing grain.

Forward movement of the harvester causes the cut grain to fall rearwardly onto auger conveyor means 17 which consists of opposed augers 18 and 19 journaled in the platform end members 13 and 14 at 20 and 21 respectively. The augers 18 and 19 are unjournaled at their inner ends as shown at 22 and 23 respectively. Material such as grain stalks are fed laterally over the tops of the augers by means of flight members 24 and 25 to a position centrally between the augers designated by the numeral 26. Inwardly extending paddle members 27 and 28 on the augers 18 and 19, respectively, are adapted to feed material delivered to the space 26 rearwardly into an undershot conveyor or the like 29 whereupon the material is fed upwardly and rearwardly into a complementary part of the harvester designated by the numeral 30, which, as stated above, may be a threshing mechanism, chopper or any mechanism for treating harvested grain.

A tubular member 31 is disposed rearwardly of and slightly above the sickle bar 15 and is journaled in end walls 13 and 14 at 32 and 33. The tubular member 31 is positioned between the sickle and the auger conveyors 18 and 19 and is parallel to both of said elements. The member 31 is disposed forwardly of and below said auger conveyors so that grain cut by the sickle may fall unhindered onto the auger conveyors.

As best shown in Fig. 2 the tubular member 31 has a central shaft member 34 extending laterally outwardly through the end wall 13 and has a sprocket 35 mounted thereon. A chain 36 is carried by the sprocket 35 and imparts rotational drive to the tubular member 31 from the shaft 37 and sprocket 38. A sprocket 39 is also driven by the chain 36. This last-named sprocket is mounted on a shaft 40 on which is mounted the auger conveyor 18. It will thus be seen that drive of the sprocket 38 imparts rotational drive to the auger 18 and thus also the tubular member 31. As shown in Figs. 3, 4 and 5, the shaft 34 on which the tubular member 31 is carried is square in cross-section throughout the space between the end walls 13 and 14 and is designated as 34ª. The outwardly extending portion of the shaft 34 is circular for rotational journalling within the bearing member 32. The opposite end of the shaft 34 is carried in a bearing 41 adjacent the end wall 14. Spacer members 42 are provided at regular intervals on the square shaft portion 34ª and support an outer circular housing 43. Flat knife blades 44 are riveted or otherwise fastened at 45 to the spacer members 42 and extend radially outwardly from a position adjacent the shaft 34ª outwardly beyond the outer housing 43. The knife blades 44 are disposed at right angles to the shaft 34ª and thus extend longitudinally of the platform. The outer ends of the blades 44 have an inverted V shape so that the ends thereof form apices as shown at 46. The angled portions 47 and 48 of the knife blade 44 are sharpened by means of beveled edges.

As shown in Figs. 1, 2 and 3, the flat blades 44 are mounted in pairs so that they form a diametrically disposed blade extending straight through the tubular housing 43. The alternate blades 44 are disposed at right angels to each other so that as shown in Fig. 3 the blades 44 at the extreme left side of the figure are horizontally disposed and the blades 44 in the center of the figure are vertically disposed.

The function of the rotary cutter member 31 is to cut fallen grain stalks prior to the time when they reach the auger conveyors 18 and 19, thus preventing winding or entangling of the grain stalks about the cores of the augers. Further, long grain stalks are additionally cut preventing their winding about the auger conveyors and thus the cutter performs an important function in the successful operation of a harvester platform throughout all conditions of grain at the time of harvest.

As best shown in Fig. 5, the tubular member 31 is provided with an auxiliary bearing support at substantially the center of the platform by means of a wooden block or the like 49. A metal strap 50 is fastened by bolt means 52 and 53 to the floor portion 11 of the platform. The floor portion of the platform is shown more specifically in Fig. 5 as having an angle member 54 at the forward edge thereof for support of the sickle bar 15 and is provided with a downwardly curved or concave rearwardly extending portion 55.

The operation of this machine comprises the transporting of the platform through a field of standing grain, and regardless of whether the grain has been blown over by storms or is long and unwieldy to handle, the rotary cutter member 31 acts as an auxiliary cutter along with the regular sickle bar to sever the stalk prior to the time when it is deposited on the auger conveyors for transverse movement. The severing of the stalk from its roots insures that the stalks will not wind about the augers and thereupon insures easy and continual feeding of harvested grain from the sickle bar to the central portion of the platform between the auger conveyors at 26.

Numerous details of construction may be varied throughout a wide range without departing from the principles disclosed herein, and I therefore do not propose limiting the patent granted hereon otherwise than as necessitated by the appended claims.

What is claimed is:

1. A cutter for a harvester platform in which the platform is equipped with a sickle type cutter bar extending along the forward edge thereof and an auger conveyor parallel to and spaced rearwardly of said sickle type cutter bar, said cutter including a member journaled on said platform intermediate said sickle type cutter bar and said auger conveyor and disposed parallel thereto, and radially extending cutting blades carried on said member at spaced intervals along the length thereof, whereby harvested grain stalks will be cut sufficiently to avoid wrapping of the stalks around the auger conveyor.

2. A device as set forth in claim 1 in which the radially extending cutting blades are placed at short regular intervals along the tubular member.

3. A device as set forth in claim 1 in which the radially extending cutting blades contain straight through substantially flat members, the opposite ends of which are V-shaped with the apices thereof at the outer ends.

4. A device as set forth in claim 1 in which the radially extending blades are substantially flat and are diametrically opposed.

5. A device as set forth in claim 1 in which alternate blades are disposed at right angles to each other.

6. A harvester platform comprising a sickle extending across the leading edge thereof, auger conveyor means spaced rearwardly of said sickle, and a rotary cutter positioned between said sickle and said auger conveyor means, said rotary cutter being parallel to said sickle and said auger conveyor means and being positioned above and rearwardly of said sickle and forwardly and below said auger conveyor, whereby grain cut by said sickle may fall over onto the auger conveyor means without interference from the rotary cutter and the rotary cutter is adapted to cut fallen uncut grain stalks prior to the time of reaching the auger conveyor means.

REXFORD D. DOWNING.

REFERENCES CITED

The following references are of record in the file of this patent:

UNITED STATES PATENTS

| Number | Name | Date |
| --- | --- | --- |
| 1,576,862 | Snow | Mar. 16, 1926 |
| 1,868,918 | Schenk | July 26, 1932 |
| 1,905,410 | Innes | Apr. 25, 1933 |
| 2,000,249 | Pew | May 7, 1935 |
| 2,338,932 | Grant | Jan. 11, 1944 |
| 2,347,907 | Hill | May 2, 1944 |